United States Patent [19]

Shea

[11] Patent Number: 5,438,323

[45] Date of Patent: Aug. 1, 1995

[54] FAIL SAFE FLUID LEVEL DETECTION CIRCUIT

[75] Inventor: Arthur W. Shea, W. Somerville, Mass.

[73] Assignee: Scully Signal Company, Wilmington, Mass.

[21] Appl. No.: 76,809

[22] Filed: Jun. 14, 1993

[51] Int. Cl.⁶ ............................................ G08B 21/00
[52] U.S. Cl. .................... 340/620; 340/603;
    340/612; 340/618; 73/290 R; 73/304 R; 200/190
[58] Field of Search ............... 340/603, 612, 618, 620;
    73/290 R, 304 R; 200/190

[56] References Cited

U.S. PATENT DOCUMENTS

| 4,165,509 | 8/1979 | Betts et al. | 340/620 |
| 4,224,606 | 9/1980 | Bartles | 73/304 R |
| 4,244,385 | 1/1981 | Hotine | 340/620 |
| 4,280,164 | 7/1981 | Kozek | 340/507 |
| 4,367,462 | 1/1983 | Dressler | 340/620 |
| 5,287,086 | 2/1994 | Gibb | 340/612 |

Primary Examiner—John K. Peng
Assistant Examiner—Edward Lefkowitz
Attorney, Agent, or Firm—Bookstein & Kudirka

[57] ABSTRACT

A fail safe output stage for a tank fluid level detection circuit having power supply/output leads periodically places a shunt across the leads to periodically generate a LOW signal which alternates with a HIGH signal to indicate an underfilled condition. In a filled condition, a steady signal appears across the leads. The output stage of the detection circuit consists of a parallel connection of switching devices where the "on" impedance of any single switching device is insufficient to place the detection circuit output lead in a LOW logic state. Therefore, in a condition where one of the switching devices fails, the detection circuit output may continue to alternate, but the alternating output is not recognized as such by a disable circuit which does not detect a LOW logic condition on the output lead. Accordingly, the failed output is interpreted as an filled condition, resulting in a shutdown of the system.

26 Claims, 2 Drawing Sheets

FAIL SAFE FLUID LEVEL DETECTION CIRCUIT

BACKGROUND OF THE INVENTION

A. Field of the Invention

This invention relates generally to fluid level detection apparatus which can be used in overfill protection devices used for protecting against overfilling of storage or transport tanks, and more particularly to fail-safe probe circuits for determining the level of fluids or other materials within the tanks.

B. Description of the Related Art

Tanks used for storing or transporting flammable fluids such as gasoline, diesel fuel and other hazardous petroleum products are often equipped with overfill protection devices to stop the filling operation when the tanks are full, and thereby prevent waste and protect the environment from spillage due to overfilling.

The tanks can be mounted on tanker trucks or located underground at service stations. Tanker trucks are typically filled with the fluids using pumping equipment at loading racks of marketing terminals, and underground storage tanks are typically gravity filled from the trucks.

An overfill protection device is used with each tank to disable the pumping equipment at the marketing terminals or to close a truck-mounted flow valve at the service station when the limit of the tank's capacity is reached.

Such an overfill protection device typically has a detection circuit and a disable circuit. The detection circuit, in turn, has a probe located within the tank which generates an electrical sensor signal that indicates when the fluid within the tank exceeds a pre-determined level. The detection circuit is connected to the disable circuit by an electrical cable so that the sensor signal is forwarded to the disable circuit. In response to the sensor signal, indicating that a particular tank is overfilled, the disable circuit operates to stop flow into that tank (for example, by disabling the pumping equipment at the loading rack or by closing the flow valve on the truck).

The detection and disable circuits are both powered from a controller circuit mounted near the tank (e.g., on the tanker truck or at the service station) and, for applications involving filling of tanks with hazardous materials, the detection circuit, the disable circuit and the controller circuit are designed to be "fail safe." In this context, "fail safe" means that no single failure of a component or wiring in the detection circuit, the disable circuit or the controller circuit can cause a condition in which the tank is overfilled or overflows.

The design and construction of fail safe power supplies for the controller circuit and for the disable circuit is well-known and the details are not of significance in understanding the present invention.

However, in order to make the detection circuit fail safe, special logic signals are used to indicate full and underfilled conditions. These special logic signals are used to prevent a short circuit or an open circuit in the output section of the detection circuit from mimicking an overfill or underfill condition. For example, if a single logic level (either a "HIGH" logic level or a "LOW" logic level were used to represent an underfilled condition, a short circuit or an open circuit would prevent the disable circuit from properly sensing the tank condition.

Accordingly, the detection circuits are conventionally designed so that the sensor signal alternates between HIGH and LOW logic states when the tank is not overfilled, whereas the sensor signal remains at a single logic state, e.g., HIGH, when the predetermined tank limit is reached or exceeded.

Known detection circuits commonly use a single pair of leads both to provide power to the detection circuit and to serve as output signal leads. One of the leads is conventionally grounded, leaving a single lead to provide power and to convey the output signal to the disable circuit. The alternating sensor signal is produced by periodically operating a switching device in the output section of the detection circuit which switching device, in turn, periodically turns "on" and places a low impedance across the detection circuit output lead which is normally maintained in a HIGH logic state by the power supply. The low impedance pulls the detection circuit output lead into a LOW logic state. Accordingly, a failure of the output switching device which produces either a permanent open or short circuit at the output switching circuit causes the alternating signal to stop thereby placing the detection circuit permanently in an "overfill" output condition and preventing an actual overfill.

While conventional alternating output detection circuits are generally suitable for their intended applications, it has been found that, under specific fault conditions, the output switching device can become shorted in such a way that it conducts current non-linearly with applied voltage. Many conventional controller circuits are designed to operate with several different types of probes, including optical probes and thermistor probes, and control the power supply voltage in accordance with the sensed current draw. In the case of a failure which produces a non-linear impedance, the detection circuit can interact with the controller to produce an alternating output which can be erroneously sensed by the disable circuit as an "alternating" voltage even when an overfill condition occurs, thereby providing false sensor signals that do not accurately indicate the level of fluid in the tank.

In addition, it is possible to connect the detection circuits to the power source in a reverse manner so that, as with a failure in the output section, a non-linear impedance across the output results which, in turn, generates an alternating output even during an overfill condition. Therefore, the conventional detection circuits are not truly "fail safe" devices.

Accordingly, it is an object of the present invention to provide a detection circuit for an overfill prevention device that is truly "fail safe".

It is another object of the present invention to provide a detection circuit for an overfill prevention device which is simple and economical in construction.

It is still another object of the present invention to provide a detection circuit for an overfill prevention device that is "fail safe" even if connected in a reverse manner to the power supply.

DESCRIPTION OF THE INVENTION

SUMMARY OF THE INVENTION

The present invention resides in a fail safe output stage for a detection circuit in an overfill prevention device. The output stage consists of a parallel connection of switching devices where the "on" impedance of any single switching device is insufficient to place the detection circuit output lead in a LOW logic state. Therefore, although the detection circuit output may continue to alternate after failure of one of the output switching devices, the alternating output is not recognized as such by the disable circuit which does not detect a LOW logic condition on the output lead. Thus, the disable circuit treats the detection circuit output as a single logic level and registers an overfill condition.

A further fail safe feature is provided by connecting a diode in series with the output, which diode prevents the generation of an ambiguous intermediate voltage level which can be erroneously interpreted if the detection circuit is connected in a reverse manner to the power supply.

BRIEF DESCRIPTION OF THE DRAWING

For a more complete understanding of the nature of the invention, reference should be made to the following detailed description taken in connection with the accompanying drawings, in which.

DESCRIPTION OF A PREFERRED EMBODIMENT

Figure 1:
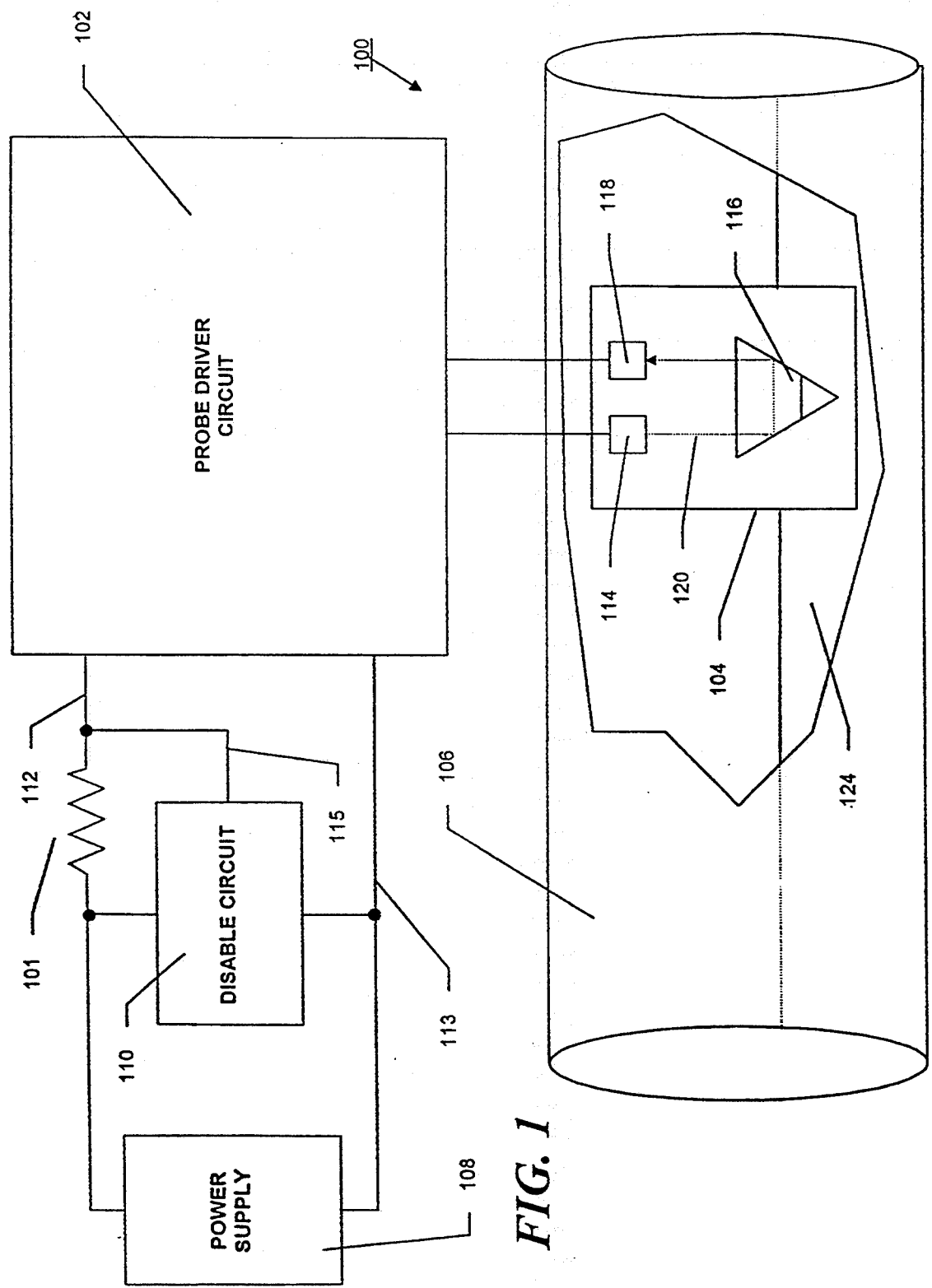
FIG. 1 is block diagram of a detection circuit incorporating a probe driver circuit and a probe located in the protected tank.

FIG. 1 shows a detection circuit 100 including a probe driver circuit 102 and a probe 104 disposed in a tank 106. The detection circuit is powered by a power supply schematically shown as supply 108.

A disable circuit 110 is connected across the power supply 108 and receives power from the supply. The probe driver circuit 102 also receives power from the supply 108 by means of a fail safe current-limiting resistor 101 connected in series with power supply 108 and driver circuit 102. Current-limiting resistor 101 limits the maximum current flowing to the driver circuit 102 in the event that a failure or a short circuit occurs in the driver circuit 102.

The disable circuit 110 detects the voltage across leads 112 and 113 of driver circuit 102 and when the driver circuit 102 periodically places a low impedance across the leads, the disable circuit 110 senses the voltage drop across resistor 101 by means of sensing lead 115 and enables fill valves (not shown) that allow the tank 106 to be filled. Alternatively, when the driver circuit 102 generates only a single level output signal, the disable circuit 110 will disable the fill valves and prevent overfilling of the tank 106.

Probe 104 incorporates a light source 114, such as a photodiode, a corner prism 116 and a light sensor 118, such as a phototransistor. Either visible light or, preferably, infrared light may be used in the sensor.

The light source 114, prism 116 and light detector 118 are arranged in an optical path 120 schematically shown in FIG. 1. When so arranged, light generated by the source 114 travels to the prism 116. When the prism 116 is located above the level of the fluid 124 in tank 106 (the prism 116 is "dry") the indices of refraction of the prism 116 and the surrounding air are such that the prism 116 acts as a retroreflector. Consequently, the light is reflected back to the light detector 118. However, when the prism 116 becomes submerged in the fluid 124, the indices of refraction are such that the light passes out of the prism 116 and does not return to the light detector 118.

Thus, when the fluid level 124 in the tank 106 is below the probe level and, thus, does not interrupt the optic path 120, the probe driver circuit 102 produces an output that alternates between the HIGH and LOW logic levels. When the fluid 124 in the tank 106 reaches the probe level, the probe driver circuit 102 produces an output that remains at a single logic level for as long a period of time as the fluid is at, or above, that level.

Figure 2:
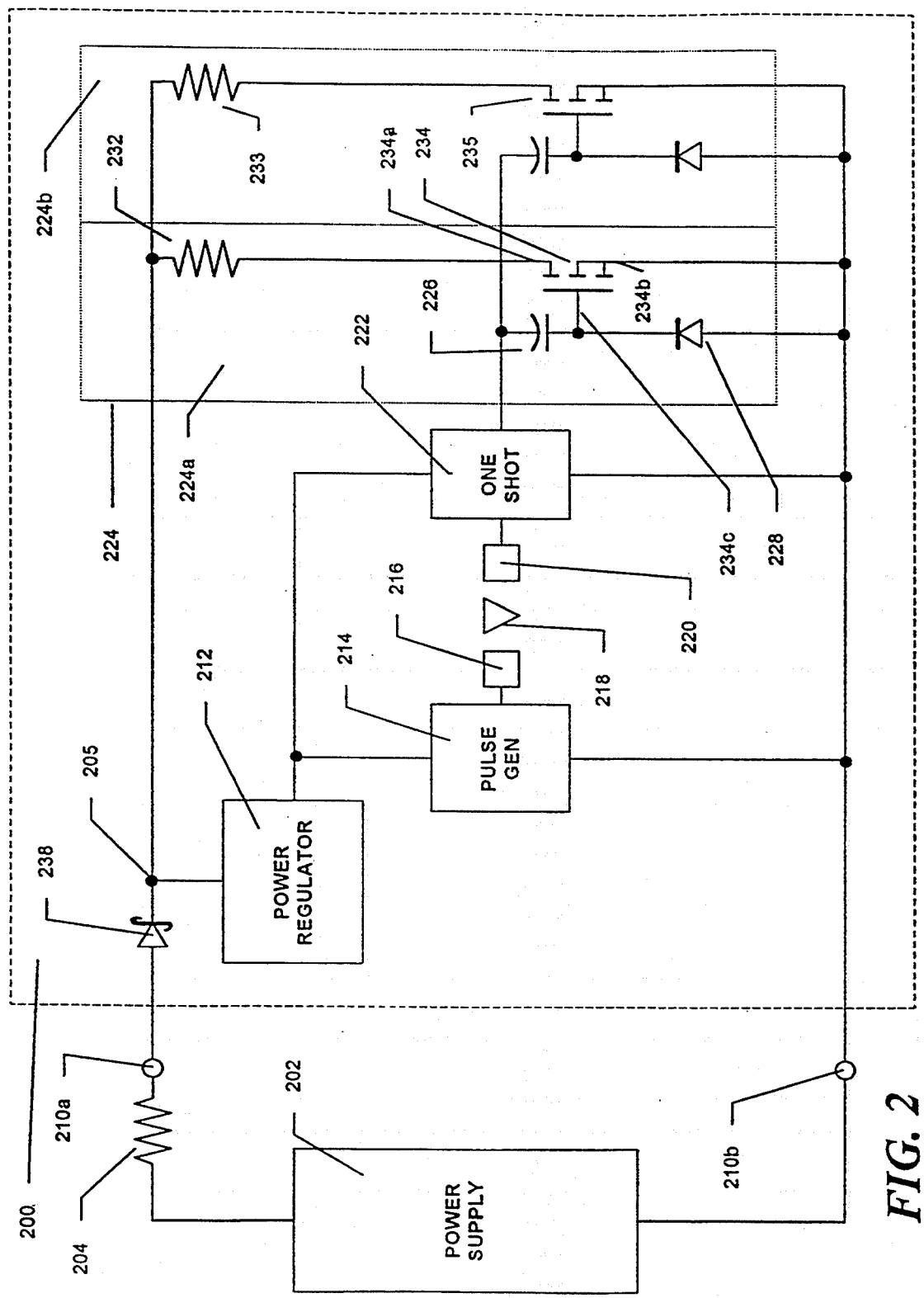
FIG. 2 is a detailed block diagram, partially in schematic form, of a probe driver circuit incorporating an output driver circuit constructed in accordance with the invention and a Schottky diode.

As shown in FIG. 2, a probe driver circuit 200 constructed in accordance with the invention includes a power regulator 212, a pulse generator 214, a probe (incorporating a light source 216, a prism 218 and a light sensor 220), a monostable oscillator ("one-shot") 222, and an output stage 224.

The power regulator 212 receives a current-limited voltage from a power source 202 via a first input/output (I/O) terminal 210a, and provides a regulated, current-limited voltage of, e.g., 5 volts, to power the rest of the probe driver circuit 200 including components 214,216 and 222. Power regulator 212 includes an energy storage device such as a capacitor so that it continues to provide power to the circuitry components even when the output section of the driver places a low impedance across the I/O lines and reduces the voltage to the logical LOW value.

In response to the applied power, pulse generator 214 produces a pulse signal output consisting of a train of pulses at a pre-selected frequency. The pulse signal duty cycle is low—the output voltage is LOW for a preselected first period of time and HIGH for a preselected, substantially-longer second period of time.

The pulse output of generator 214 is applied to a light source 216 which may, for example be a light-emitting diode and, in response, the source emits a photoflash, i.e., a burst of light, whenever the pulse signal is LOW. As previously mentioned, the light signal is directed along an optic path to the prism 218 and, in an underfilled situation, is returned to the light sensor 220.

The light sensor 220, e.g., a photo-transistor, receives the light pulse and, in response, triggers the one-shot 222 which thereupon generates an electrical pulse of a pre-selected duration. As will hereinafter be described, the pulse from the one-shot 222 turns on the output stage 224 of the probe circuit 200 which places a low impedance across the I/O leads 210a and 210b. The output stage 224 includes two, parallel-connected output sections 224a and 224b, which are preferably of identical implementation.

Each output section 224a, 224b has a resistor 232, 233 connected to a field effect transistor ("FET") 234,235 or other switching device, such as a bi-polar transistor or reed switch. Specifically, each FET, such as FET 234, has a first terminal 234a (e.g., the source electrode), a second or output terminal 234b (e.g., the drain electrode) and a third or control terminal 234c (e.g., the gate electrode). The one-shot 222 applies the generated output pulses to a trigger circuit consisting of capacitor 226 and diode 228. Capacitor 226 A.C. couples the one-shot pulse to the control terminal 234c to switch the FET 234 into its "on" or low-impedance state and diode 228 clamps the output. When both FETs 234 and 235 turn "on", resistors 232 and 233 connected to the output terminals 234c and to node 205 are connected in series with Schottky diode 238 across I/O terminals 210a and 210b.

During operation, when the FETs 234 and 235 switch "on", the I/O terminals 210a and 210b are bridged by FETs 234 and 235 resulting in a voltage drop across resistor 204 for a time duration equal to that of the pulse length of the one-shot 222. The voltage drop on the I/O terminal 210a indicates a first logic state, with a voltage value established by the magnitude of the shunting impedance relative to the power supply resistance 204. The shunting impedance value is, in turn, established by the values of resistors 232 and 233, the turn-on resistance of the FET's 234 and 235 (e.g., a few ohms) and the forward bias voltage of the Schottky diode 238 (approximately 0.4 volts).

When the FETs 234 and 235 are not switched "on", the voltage on the I/O terminal 210a remains at a "high" level, whose magnitude is established by the power source 202 and the quiescent current draw of the components 214, 216 and 220. The "high" level of the voltage on the I/O terminal 210a indicates a second logic state on the I/O terminal 210a, and serves to replenish energy in the power regulator 212 internal energy storage used by the circuit 200 when the output stage shunts the I/O terminals.

In accordance with the invention, the first and second sections of the output stage are implemented such that both FETs 234 and 235 need to be switched "on" in order for shunting impedance to be low enough to place the circuit in the first logic state. If either of the FETs 234, 235 misfunctions, e.g., due to a gate-to-source short or an open gate in either device, so that the affected FET fails to turn "on", the impedance of the remaining section is insufficient to cause a sufficient voltage drop across power supply resistor 204 to place the I/O terminal in a first logic state. Consequently, as previously mentioned, the disable circuit will not recognize the alternating output signal and will instead signal an overfill condition.

In a similar manner, in the event either of the FETs 234 and 235 fails in such a way so as to conduct current non-linearly with applied voltage (for example, if a gate-to drain short occurs), the current conducted through the single failed FET will not cause a sufficient drop across the power supply resistor 204 so that the voltage across the I/O terminals 210a and 210b is interpreted as a LOW or first logic state, and thus the output will not alternate between the logic states. Again, the disable circuit 110 will not permit the filling of the tank 106. Advantageously, the single failure of either FET 234 or FET 235 will disable the probe driver 200, thereby warning of a need to repair or replace the driver circuit.

The Schottky diode 238 prevents the probe circuit 200 from generating an alternating voltage level on the I/O terminals 210a and 210b if the probe circuit 200 is incorrectly connected with the power supply 202 and the disable circuit 110, e.g., with terminals 210a and 210b interchanged. More particularly, if the connections at terminals 210a and 210b are reversed so that positive voltage is applied to terminal 210b, FETs 234 and 235 present a non-linear impedance due to the internal construction of the FETs. This non-linear impedance would then generate an alternating output which could be erroneously interpreted. However, diode 238 also becomes reverse biased in this situation and prevents any reverse current flow. Thus, an intermediate voltage is not produced and there is no chance of an erroneous interpretation. A Schottky diode is used so that the forward-bais voltage is as low as possible (0.4 volts) and thus the diode has minimal effect on the normal operation of the circuit.

Thus, it will be seen that an improved fail safe probe driver circuit has been described. The terms and expressions that have been employed herein are terms of description and not of limitation. In the use of such terms and expressions, there is no intention of excluding any equivalents of the features shown and described. It is recognized that various modifications are possible within the scope of the invention claimed. In addition, other modifications and changes will be immediately apparent to those skilled in the art. For example, although the illustrative probe driver has been disclosed for use in an overfill protection system, the driver can obviously be used in other applications where a probe is needed to sense a fluid level. For example, such a probe system could be used to sense when a tank was empty as well as filled. These changes and modifications are intended to be covered by the appended claims.

What is claimed is:

1. A probe circuit for indicating a level of fluid in a tank, said probe circuit comprising:
   A) a sensor disposed within said tank generating a sensor signal indicative of whether fluid in the tank is above a predetermined level;
   B) circuit means for providing power to said sensor and for detecting a first output signal and a second output signal; and
   C) an output stage coupled with said circuit means and including first and second switching means each responsive to said sensor signal to switch from a first switched state to a second switched state when the sensor signal indicates that the fluid in the tank is above said predetermined level, said output stage generating said first output signal to indicate that the fluid is below said predetermined level if both said switching means are in said first switched state, and said output stage generating said second output signal if either of said switching means is in said second switched state.

2. The probe circuit in accordance with claim 1, wherein each said switching means includes a transistor switch.

3. The probe circuit in accordance with claim 1, wherein either of said switching means is in said second switched state when that said switching means fails.

4. The probe circuit in accordance with claim 3, wherein each said switching means includes a transistor switch.

5. The probe circuit in accordance with claim 4, wherein each said switching means is in said first switched state when said transistor switch it includes is turned "on", and each said switching means is in said second switched state when the transistor switch it includes is turned "off".

6. The probe circuit in accordance with claim 3, wherein said circuit means comprises an output lead.

7. The probe circuit in accordance with claim 1, wherein said output stage generates said first output signal such that it is detected by the circuit means as an alternating signal, and wherein said output stage generates said second output signal such that it is detected by the circuit means as a non-alternating signal.

8. The probe circuit in accordance with claim 1, wherein each said switching means is in said second switched state when that said switching means is malfunctioning.

9. An overfill protection apparatus comprising a detector including a probe, a disable circuit coupled with a detection circuit, and a power supply, said probe comprising:
   A) a sensor disposed within a fluid container and generating a sensor signal in response to a fluid level in said container;
   B) terminal means coupled with said power supply for receiving power therefrom and coupled with said disable circuit for providing an output signal thereto; and
   C) an output stage for generating said output signal, said output stage including first and second parallel switching means which are responsive to the sensor signal each switching means, in response to the sensor signal, coupling one of a first and a second impedance to said terminal means so that the coupling of each of said first and second impedance modifies an output impedance of the terminal means, said output signal alternating between a first and a second magnitude to indicate a fluid level in said container below a predetermined level and substantially maintaining said first magnitude to indicate a fluid level in said container at or above said predetermined level, said output signal having said first magnitude when only one of said first and second impedance is coupled to said terminal means, and having said second magnitude when both of said switching means have coupled said first impedance and said second impedance with said terminal means, whereby said output signal cannot indicate said first fluid level unless both of said switching means couple said first impedance and said second impedance with said terminal means.

10. The protection apparatus in accordance with claim 9, wherein said first magnitude corresponds to a first voltage level of said output signal, said second magnitude corresponds to a second voltage level of said output signal, and said apparatus further includes diode means coupling said output stage with said terminal means for preventing generation of an output signal voltage level between said first and second voltage level that results from improper coupling of said probe to said power supply.

11. The probe circuit in accordance with claim 9, wherein said output signal substantially remains at said first magnitude if either of said switching means fails.

12. The probe circuit in accordance with claim 9, wherein each said switching means includes a transistor switch.

13. The probe circuit in accordance with claim 12, wherein when both of said transistor switches are turned "on", the output signal has said second magnitude and, when either of said transistor switches is turned "off", the output signal substantially has said first magnitude.

14. The probe circuit in accordance with claim 12, wherein the output stage comprises an output lead.

15. An overfill detection apparatus for detecting an overfill condition in a fluid container, the apparatus comprising:
   a fluid sensor disposed within the container, the sensor generating a sensor signal indicative of whether fluid in the container is above a predetermined level; and
   an output stage comprising first and second switching means each of which, when functioning properly, is responsive to the sensor signal to switch from a first switched state to a second switched state when the sensor signal indicates that the fluid in the container has risen above said predetermined level, the switching means each contributing to the generation of an output signal, the output signal being in a first state to indicate that the fluid is below said predetermined level only when both of the switching means are in the first switched state, and the output signal being in a second state when either of the switching means is in the second switched state.

16. An apparatus in accordance with claim 15 wherein the sensor signal is an alternating signal.

17. An apparatus in accordance with claim 15 wherein each of said switching means comprises a transistor.

18. An apparatus in accordance with claim 17 wherein the transistors are in a parallel configuration.

19. An apparatus in accordance with claim 18 wherein each transistor is normally biased with a DC voltage and, for each transistor, said voltage bias is reduced in magnitude by the switching of that transistor.

20. An apparatus in accordance with claim 15 wherein the output signal is normally biased with a DC voltage, and wherein the contribution of each switching means to the output signal is such that the response of each switching means to the sensor signal provides a new circuit path to the output signal so as to reduce the DC voltage magnitude of the output signal.

21. An apparatus in accordance with claim 20 wherein the contribution of only one of said first and second switching means to the generation of the output signal is insufficient to place the output signal in said first state.

22. An apparatus in accordance with claim 15 wherein said second state of the output signal is a non-alternating voltage and said first state of the output signal is an alternating voltage.

23. An apparatus in accordance with claim 15 wherein the sensor signal is a pulsed signal when the fluid in the container is below said predetermined level, the pulses of which are received by each switching means and, when each switching means is functioning properly, cause outputs of the switching means to be switched from a first signal level to a second signal level.

24. An apparatus in accordance with claim 23 where the outputs of the first switching means and the second switching means are both output at a first electrical point of the output stage.

25. An apparatus in accordance with claim 24 wherein a second electrical point of the output stage on which the output signal is output is electrically coupled to said first electrical point so that magnitude changes in the outputs of the first and second switching means cause magnitude changes in the output signal.

26. An overfill detection apparatus for detecting an overfill condition in a fluid container, the apparatus comprising:
   a fluid sensor disposed within the container, the sensor generating a sensor signal indicative of whether fluid in the container is above a predetermined level, the sensor signal being a pulsed signal when the fluid in the container is below said predetermined level; and
   an output stage comprising first and second switches which, when functioning properly, are responsive to the sensor signal such that each pulse of the sensor signal cause an output of each of the switches to be switched from a first magnitude to a second magnitude for the duration of the pulse, the switches being arranged in a parallel configuration such that the output of each switch contributes to the generation of an output signal that has a first state which is indicative of the fluid level in the tank being below said predetermined level, the output signal being in the first state only when both switches are responsive to the sensor signal and are switched between the first magnitude and the second magnitude.

* * * * *